(12) United States Patent
Mochizuki et al.

(10) Patent No.: US 7,753,575 B2
(45) Date of Patent: *Jul. 13, 2010

(54) VEHICLE LAMP

(75) Inventors: Mitsuyuki Mochizuki, Shizuoka (JP); Seiichiro Yagi, Shizuoka (JP); Yuji Yasuda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 70 days.

This patent is subject to a terminal disclaimer.

(21) Appl. No.: 12/109,377

(22) Filed: Apr. 25, 2008

(65) Prior Publication Data

US 2008/0266890 A1 Oct. 30, 2008

(30) Foreign Application Priority Data

Apr. 26, 2007 (JP) .............................. 2007-116537

(51) Int. Cl.
*F21V 33/00* (2006.01)
(52) U.S. Cl. ........................ 362/545; 362/512; 362/544

(58) Field of Classification Search ......... 362/236–240, 362/245, 249.01, 249.03, 249.1, 269, 271–277, 362/280, 282–287, 319, 464–467, 507, 508, 362/512–515, 523–528, 532, 539, 543–545, 362/547, 549, 538
See application file for complete search history.

(56) References Cited

U.S. PATENT DOCUMENTS

2007/0183168 A1 * 8/2007 Naganawa et al. .......... 362/545

FOREIGN PATENT DOCUMENTS

| JP | 2005285509 A | * | 10/2005 |
| JP | 2006-117164 A | | 5/2006 |
| JP | 2006-179246 A | | 7/2006 |

* cited by examiner

*Primary Examiner*—Hargobind S Sawhney
(74) *Attorney, Agent, or Firm*—Sughrue Mion, PLLC

(57) ABSTRACT

A vehicle lamp is provided with a plurality of lamp units respectively including light sources, and optical units for emitting light from the light sources ahead of the lamp unit, and a driving unit configured to swivel the plurality of optical units in different strokes.

4 Claims, 16 Drawing Sheets

VEHICLE LAMP

This application claims foreign priority from Japanese Patent Application No. 2007-116537 filed on Apr. 26, 2007, the entire contents of which are hereby incorporated by reference.

BACKGROUND OF THE INVENTION

1. Field of the Invention

The present invention relates to a vehicle lamp having a plurality of lamp units and, more particularly, a vehicle lamp equipped with a swiveling mechanism for changing an illumination direction and an illumination range of a light source in answer to a traveling condition.

2. Background Art

Since an irradiation light emitted from a headlight of a vehicle illuminates a front center portion of the road, the headlight cannot often get hold of enough illumination range in front of a traveling direction during going around a curve, turning to the right or left, changing the lane, or the like. As the vehicle lamp that can satisfactorily get hold of illumination range of the irradiation light during going around a curve, or the like and makes it possible for the driver to get a good view of the road, there is a swivel type vehicle lamp equipped with a swiveling mechanism that turns the lamp unit to the left and right (see Patent Documents 1 and 2, for example).

[Patent Document 1] JP-A-2006-117164

[Patent Document 2] JP-A-2006-179246

The swivel-type vehicle lamp is constructed such that the lamp unit is supported to a frame member, which is supported to the lamp body, via the swiveling mechanism to turn leftward and rightward. The lamp unit and the swiveling mechanism are respectively controlled by a control unit in response to a traveling condition of the vehicle. Thus, a direction of the illumination light emitted from the lamp unit can be changed leftward and rightward by turning the lamp unit on the frame member, in response to the traveling condition of the vehicle. As a result, the illumination range of the irradiation light can be ensured ahead of the turning direction even during going around a curve, or the like, and the driver can make sure of a good side visibility during turning the vehicle.

However, in the swivel-type vehicle lamp in the conventional art, a plurality of lamp units are supported by the frame member to turn to the right and left, and the lamp units are integrally turned on the frame member in response to the traveling condition of the vehicle. Therefore, the illumination range is merely increased according to an angle at which the lamp units are turned to the right and left, and thus such vehicle lamp can respond only to the curved road whose turning radius is relatively large and which does not need the wide illumination range so much.

For this reason, an effective situation of such vehicle lamp is restricted to a sinuous road in, for example, a mountainous region, a lane change, and the like. Accordingly, the enough illumination range cannot be ensured ahead of the turning direction of the vehicle during a left or right turn at an intersection, and the like. As a result, it is considered that the effect of the swivel system cannot be sufficiently achieved.

In addition, when an turning angle of all of a plurality of lamp units is increased to ensure the enough illumination range ahead of the turning direction of the vehicle, the illumination range on the opposite side to the turning direction of the vehicle would be decreased so that a forward visibility may be lowered. In contrast, there is such a system that a plurality of lamp units are driven by respectively using a plurality of actuators (driving units). However, in this system, an overall lighting equipment may be increased in size and becomes expensive.

For this reason, the vehicle lamp that can realize a flexible light distribution change such as a swiveling of the overall light distribution by a single actuator, while adequately maintaining a position of the hot zone (high luminous intensity area) is demanded.

SUMMARY OF THE INVENTION

One or more embodiments of the invention provide an inexpensive vehicle lamp capable of making sure of a good side visibility during turning of a vehicle.

In accordance with one or more embodiments of the invention, a vehicle lamp is provided with: a plurality of lamp units respectively including light sources, and optical units for emitting light from the light sources ahead of the lamp unit; and a driving unit configured to swivel the plurality of optical units in different strokes.

According to the vehicle lamp constructed as above, desired ones of a plurality of optical units are operated together in different strokes by driving the single actuator, so that a desired light distribution can be formed. As a result, a flexible light distribution change can be realized by the small and inexpensive lighting equipment configuration.

In this case, in the vehicle lamp constructed as above, the plurality of optical units may be provided with a converging optical unit, an intermediate optical unit, and a dispersing optical unit sequentially arranged from an inner side to an outer side in a vehicle width direction, and a stroke of the dispersing optical unit may be larger than strokes of the converging optical unit and the intermediate optical unit.

According to the vehicle lamp constructed in this manner, for example, only a dispersing zone (middle luminous intensity area) can be brought into the turning direction of the vehicle, while adequately holding the positions of the hot zone (high luminous intensity area) and an middle zone (middle luminous intensity area), so that the overall light distribution is swiveled. As a result, fine formation of a light distribution pattern PL can be attained.

Also, in the vehicle lamp constructed as above, the driving unit may provided with a plurality of driven shafts respectively provided for the optical units; a plurality of cams respectively provided for the optical units, wherein the plurality of cams are mutually operable together; and a plurality of cam grooves respectively provided for the cams and engaged with the respective driven shafts to swivel the optical units in the different strokes.

According to the vehicle lamp constructed in this manner, when the cam grooves that are respectively engaged with the driven shafts of the optical units are formed to have desired offset profiles, it can be easy to individually set the optical units to desired turning angles. Also, when a plurality of sets of the first cam, the second cam, and the third cam formed by different cam grooves are previously prepared, a plurality of variations of the lighting equipment specifications applied to different angle controls can be selectively set easily.

Also, in the vehicle lamp constructed as above, the driving unit may be provided with: a plurality of force application axes respectively provided for the optical units; a plurality of intermediate links respectively provided for the optical units, wherein base ends of the intermediate links are turnably supported by respective supporting shafts, the intermediate links are coupled via coupling links to be mutually operable, and the intermediate links are engaged with only one of the force application axes corresponding to a downstream side in an interlocking force transmitting direction; a plurality of optical unit side links provided to correspond to the intermediate links except the down stream side in the interlocking force transmitting direction, turnably supported and coaxially disposed with the supporting shafts, and engaged with the force application axes of the corresponding optical units; and an interlock separating mechanism for relatively turning the optical unit side links and the intermediate links in predetermined turning positions.

According to the vehicle lamp constructed in this manner, the intermediate link and the optical unit side link with which the force application axes of the optical units are respectively engaged are relatively turned in predetermined turning positions by the interlock separating mechanism. Therefore, it can be easy to independently set individual optical units to the desired turning angles. Also, since the intermediate link and the optical unit side link can be constructed by a thin link plate, a swiveling mechanism that is lighter in weight than the configuration using a large number of gears can be realized.

According to the vehicle lamp of one or more embodiments of the present invention, the swivel driving mechanism swivels a plurality of optical units together in different strokes by one actuator. Therefore, desired ones of a plurality of optical units are driven together in different strokes, and thus a desired light distribution can be formed. As a result, according to the vehicle lamp of the present invention, a flexible light distribution change that can make sure of a good side visibility in the turning of the vehicle can be realized by a small inexpensive lighting equipment configuration.

Other aspects and advantages of the invention will be apparent from the following description, the drawings and the claims.

BRIEF DESCRIPTION OF THE DRAWINGS

FIGS. 10A and 10B are views each showing a low-beam light distribution pattern formed on a virtual vertical screen arranged in front of the lighting equipment by 25 m, by the light that is illuminated forward from the vehicle lamp, wherein FIG. 10A shows the light distribution pattern in a straight-ahead driving, and FIG. 10B shows the light distribution pattern in a right-hand curve.

DETAILED DESCRIPTION OF THE EXEMPLARY EMBODIMENTS

A vehicle lamp according to exemplary embodiments of the present invention will be explained in detail with reference to the accompanying drawings hereinafter.

Figure 1:
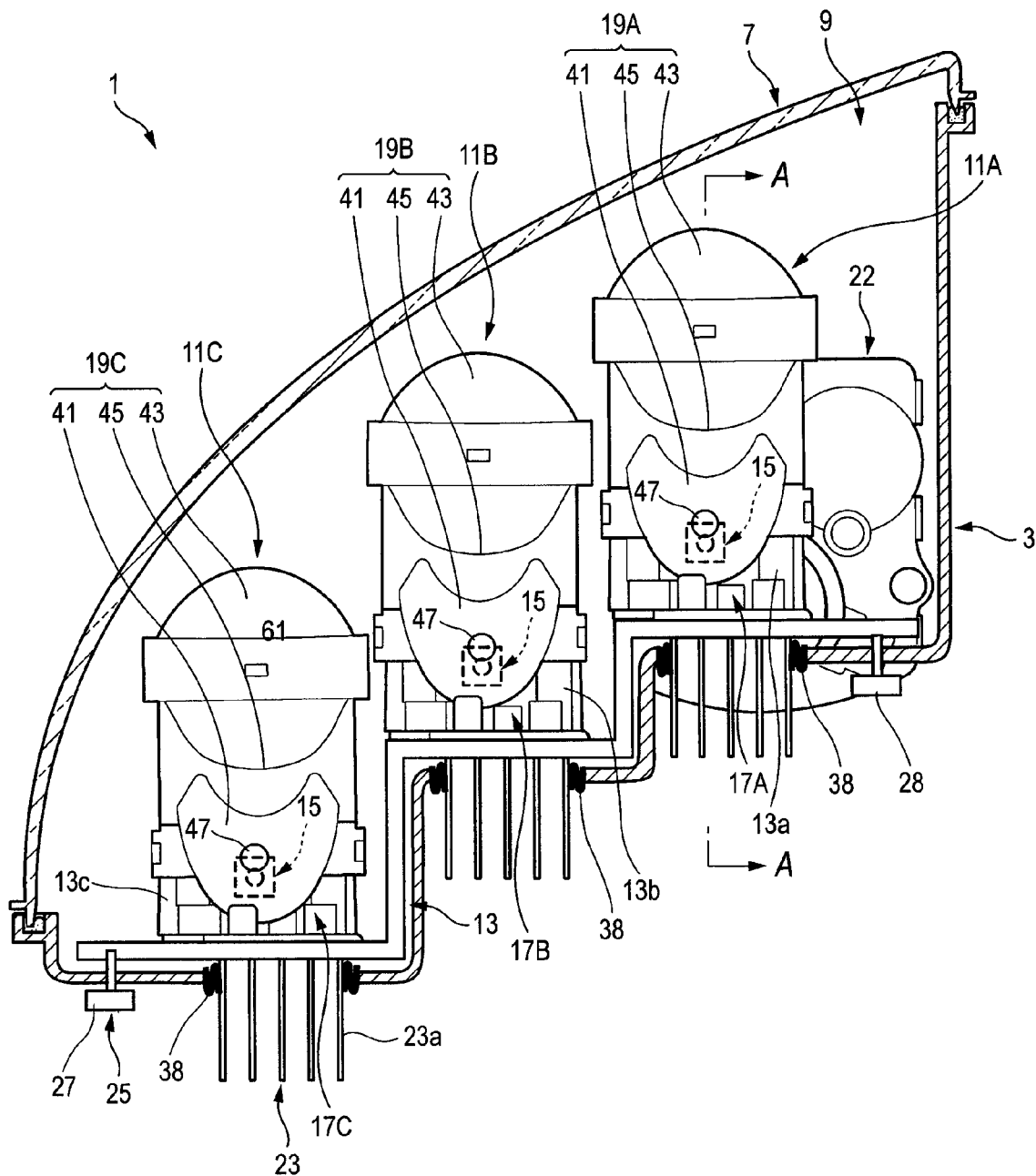
FIG. 1 is a horizontal sectional view of a vehicle lamp according to a first exemplary embodiment of the present invention.
Figure 2:
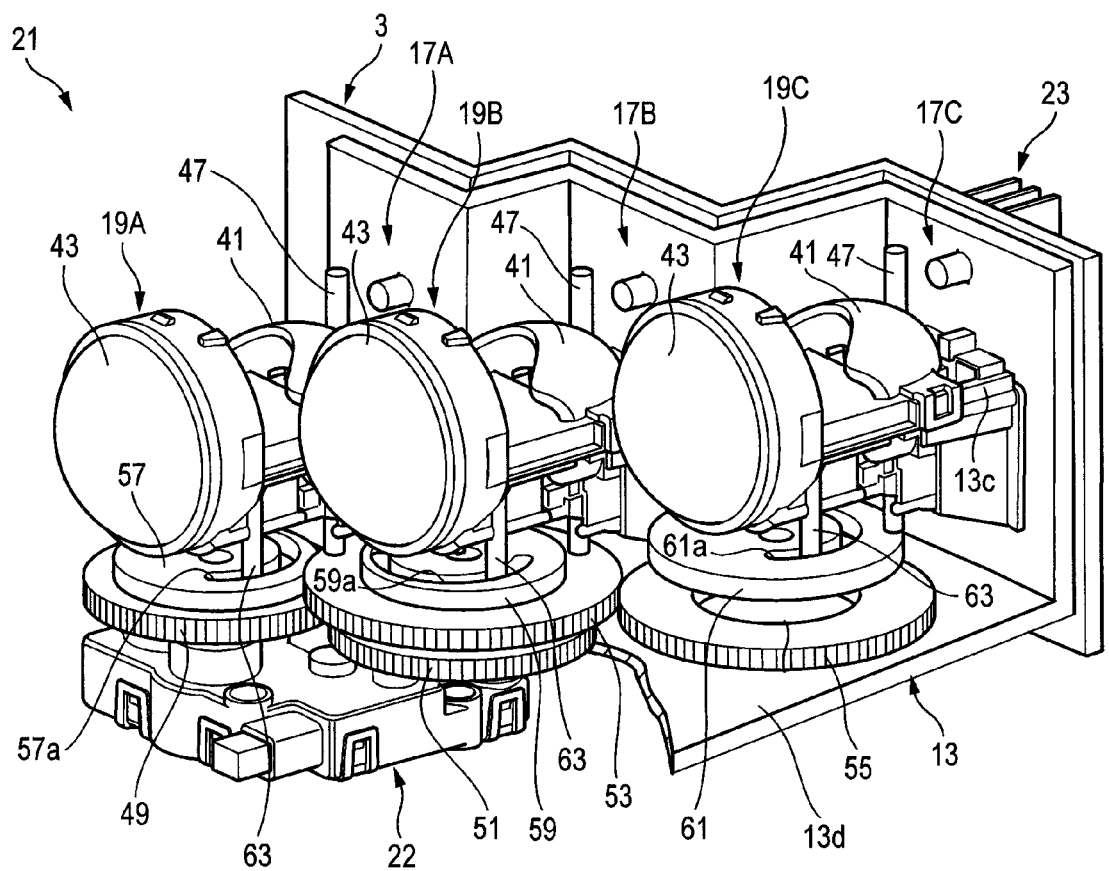
FIG. 2 is a pertinent perspective view of a lamp unit shown in FIG. 1.
Figure 3:
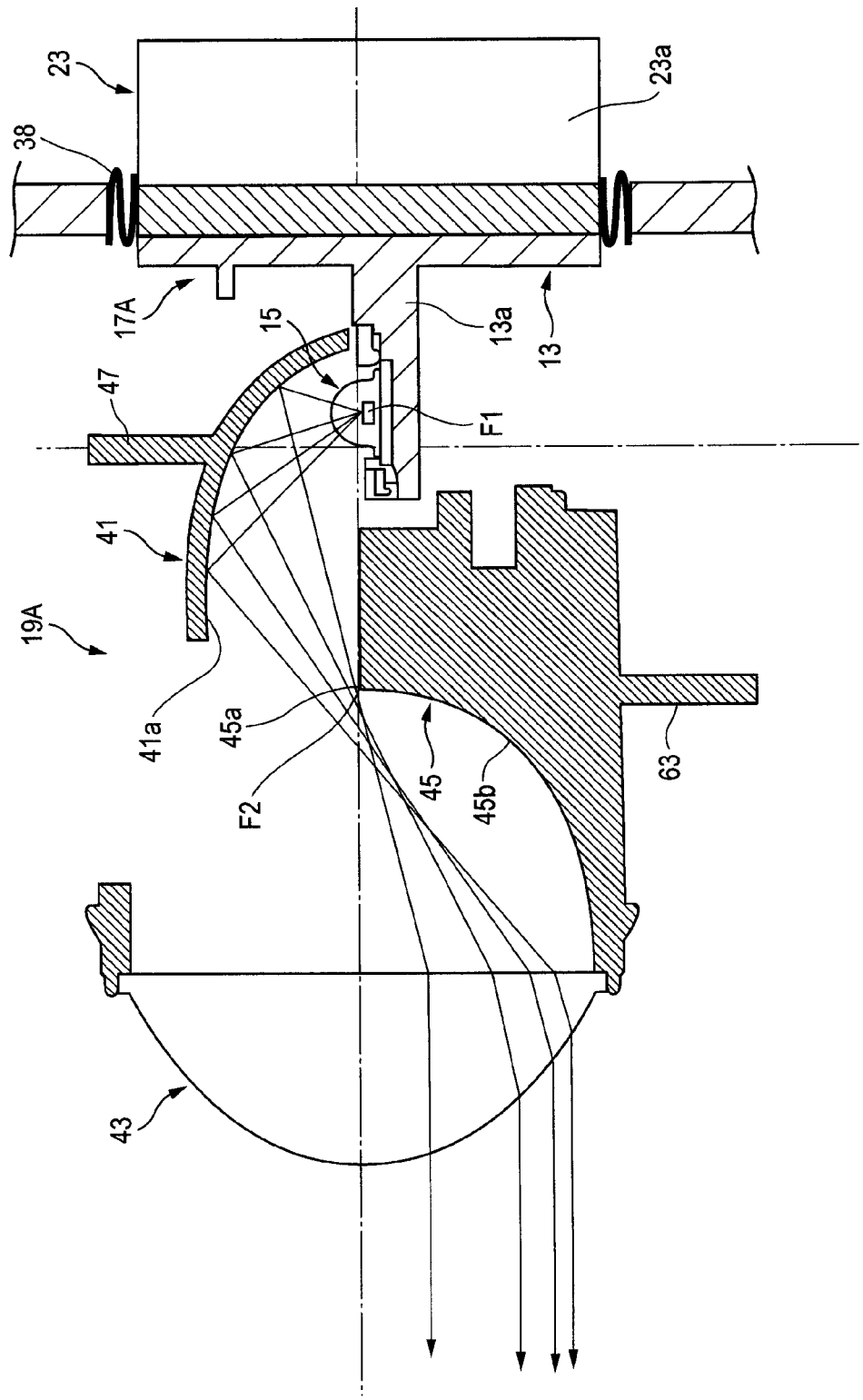
FIG. 3 is an A-A sectional view of the lamp unit shown in FIG. 1.
Figure 4:
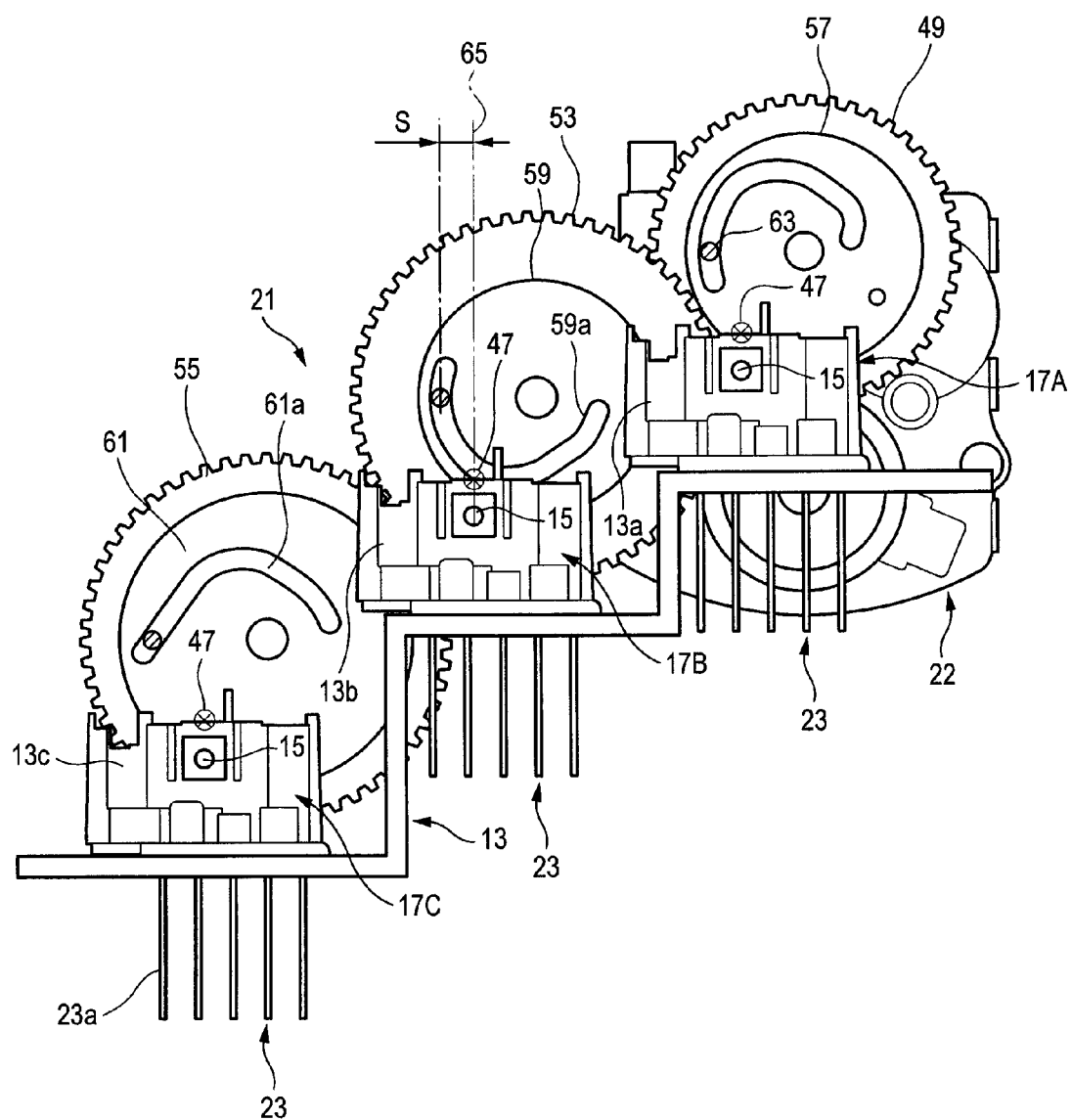
FIG. 4 is a plan view showing a swiveling mechanism shown in FIG. 2.

FIG. 1 is a horizontal sectional view of a vehicle lamp according to a first embodiment (first exemplary embodiment) of the present invention, FIG. 2 is a pertinent perspective view of a lamp unit shown in FIG. 1, FIG. 3 is an A-A sectional view of the lamp unit shown in FIG. 1, and FIG. 4 is a plan view showing a swiveling mechanism shown in FIG. 2.

As shown in FIG. 1, a vehicle lamp 1 according to the first embodiment includes lamp units in a lighting chamber 9. This lighting chamber 9 is constructed by a lamp body 3 whose front side is opened, and a transparent front cover 7 fitted to the front opening portion.

The vehicle lamp of the present embodiment consists of a plurality of lamp units 11A, 11B, 11C (three in the present embodiment). These lamp units 11A, 11B, 11C are sequentially arranged from the inner side to the outer side in the vehicle width direction (in the present embodiment, the configuration of the vehicle lamp arranged on the left side of the vehicle body is shown).

These lamp units 11A, 11B, 11C include light source units 17A, 17B, 17C in which a light emitting element 15 is respectively supported by supporting portions 13a, 13b, 13c of a unit mounting portion 13, and optical units 19A, 19B, 19C for respectively emitting the light from the light emitting element 15 ahead of the lighting equipment. Also, these lamp units 11A, 11B, 11C have a single swivel driving mechanism (swiveling mechanism) 21 for independently swiveling the optical units 19A, 19B, 19C without interlocking with light emitting element 15.

A heat radiating portion 23 is integrally provided with the light source units 17A, 17B, 17C to respectively correspond to the supporting portions 13a, 13b, 13c of the unit mounting portion 13. The heat radiating portion 23 is formed of a heat sink made of aluminum, for example. A plurality of cooling fins 23a are arranged on the outside of the heat radiating portion 23 to pass through the lamp body 3.

Also, an extension (not shown) is provided to a front end portion in the lighting chamber 9 to surround the lamp units 11A, 11B, 11C.

An aiming mechanism 25 is provided to the unit mounting portion 13. The aiming mechanism 25 can vertically and horizontally tilt the unit mounting portion 13 by aiming screws 27, 28 that are protruded from the back surface of the lamp body 3. In this case, a sealing member such as a rubber cover 38, or the like for absorbing a wobble of the aiming mechanism 25 is fitted in through holes, through which the heat radiating portion 23 is respectively passed, of the lamp body 3.

Next, configurations of the lamp units 11A, 11B, 11C will be explained hereunder.

The lamp units 11A, 11B, 11C according to the first embodiment respectively form a different luminous intensity area in one light distribution pattern. In other words, the lamp unit 11A acts as a converging lamp unit, the lamp unit 11B acts as an intermediate lamp unit, and the lamp unit 11C acts as a dispersing lamp unit. That is, the converging lamp unit 11A, the intermediate lamp unit 11B, the dispersing lamp unit 11C are sequentially arranged from the inside to the outside in the vehicle width direction.

Now, the lamp units 11A, 11B, 11C respectively have the substantially identical configuration, as shown in FIG. 1 and FIG. 2, and therefore the lamp unit 11A will be explained by way of example.

As shown in FIG. 1 to FIG. 3, the lamp unit 11A is constructed such that the optical unit 19A can be laterally swiveled with respect to the fixed light source unit 17A.

The light source unit 17A is constructed by providing the light emitting element 15 as the light source to the supporting portion 13a of the unit mounting portion 13. As described above, the heat radiating portion 23 is secured to the unit mounting portion 13. The light emitting element 15 is a white light emitting diode having a light emitting chip having a size of about 1 mm×1 mm square. This light emitting element 15 is arranged on an optical axis Ax to direct upward in the vertical direction in a state that this element is supported on the substrate having a thermal conductivity. This light source unit 17A is fixed to the unit mounting portion 13 not to move in the swiveling motion.

As shown in FIG. 3, the optical unit 19A has a reflector 41, a projection lens 43, and a shade 45.

The reflector 41 is a substantial dome-like member provided to the upper side of the light emitting element 15. The reflector 41 has a reflecting surface 41a that reflects forward the light from the light emitting element 15 to go toward the optical axis Ax in a convergent mode. The reflecting surface 41a is formed like a substantially elliptic spherical surface to have the optical axis Ax as a center axis. The light emitting element 15 is arranged on a first focal point F1 of an ellipse that constitutes a vertical sectional shape of the reflecting surface 41a. Accordingly, the reflecting surface 41a reflects forward the light from the light emitting element 15 to go toward the optical axis Ax in a convergent mode, and substantially converges the light into a second focal point F2 of the ellipse in the vertical sectional shape containing the optical axis Ax.

The projection lens 43 is constructed by a plano-convex lens whose front side surface is a convex plane and whose rear side surface is a flat plane. This projection lens 43 is arranged on the optical axis Ax such that a rear side focal point F is slightly positioned in the rear of the second focal point F2 of the reflector 41. Accordingly, this projection lens 43 projects forward an image on a focal plane containing the rear side focal point F as an inverted image.

As shown in FIG. 1 and FIG. 3, the shade 45 is formed like a block that is also used as a supporting frame for the projection lens 43 and the reflector 41. A front surface 45b directed to the projection lens 43 side constitutes a substantial egg-shell-shaped curved surface whose frontage is gradually expanded forward. Accordingly, an end portion (upper end edge) 45a located near the optical axis Ax is curved to have a concave profile, when viewed from the top, to the projection lens 43, and shaped along the rear side focal plane of the projection lens 43.

The end portion 45a of the shade 45 is arranged to align with the second focal point F2 of the reflector 41. As a result, when the light of the light emitting element 15 is reflected by the reflector 41 to be emitted forward and then arrives at the projection lens 43 via the shade 45, the lamp unit 11A emits forward the light via the projection lens 43 and projects a predetermined light distribution pattern.

Next, the gear-type driving system of the optical units 19A, 19B, 19C according to the first embodiment will be explained hereunder.

The optical units 19A, 19B, 19C are respectively constructed by integrally fixing the reflector 41, the shade 45, and the projection lens 43. The respective optical units 19A, 19B, 19C are independently and turnably held by a rotating shaft 47, which extends in the vertical direction, on the unit mounting portion 13, and are swiveled by the swivel driving mechanism 21.

As shown in FIG. 2 and FIG. 4, a first gear 49 is fixed to an output shaft of an actuator (driving unit) 22 of the swivel driving mechanism 21. This swivel driving mechanism is provided to a horizontal portion 13d of the unit mounting portion 13. The first gear 49 is engaged with a second input gear 51. A second output gear 53 is coaxially fixed to the second input gear 51. The second output gear 53 is engaged with a third gear 55.

A first cam 57 is coaxially fixed to the first gear 49. A second cam 59 is coaxially fixed to the second output gear 53. A third cam 61 is coaxially fixed to the third gear 55.

Cam grooves 57a, 59a, 61a are respectively formed in the first cam 57, the second cam 59, and the third cam 61. The cam grooves 57a, 59a, 61a respectively have a different cam profile.

A driven shaft 63 respectively provided upright to the optical units 19A, 19B, 19C (in the present embodiment, under the shade 45) is respectively engaged with the cam grooves 57a, 59a, 61a. Because the cam grooves 57a, 59a, 61a are respectively formed to have a different profile, these cam grooves 57a, 59a, 61a can respectively turn the optical units 19A, 19B, 19C in a different stroke (an amount of rotation) via the driven shaft 63, as described later.

More particularly, as shown in FIG. 4, respective offsets S of the driven shafts 63, which are engaged with the cam grooves 57a, 59a, 61a, from a center line 65 passing the rotating shaft 47 are changed when the first cam 57, the second cam 59, and the third cam 61 are respectively turned. Accordingly, the optical units 19A, 19B, 19C are turned on the rotating shafts 47 at rotating angles corresponding to the cam grooves 57a, 59a, 61a when the actuator 22 of the swivel driving mechanism 21 is driven and the first gear 49 is turned while turning the second gear 53 and the third gear 55 together. In other words, in the swivel driving mechanism 21, a plurality of optical units 19A, 19B, 19C are operated together by one actuator 22 in different strokes.

Next, an operation of the gear-type driving system will be explained hereunder.

Figure 5:
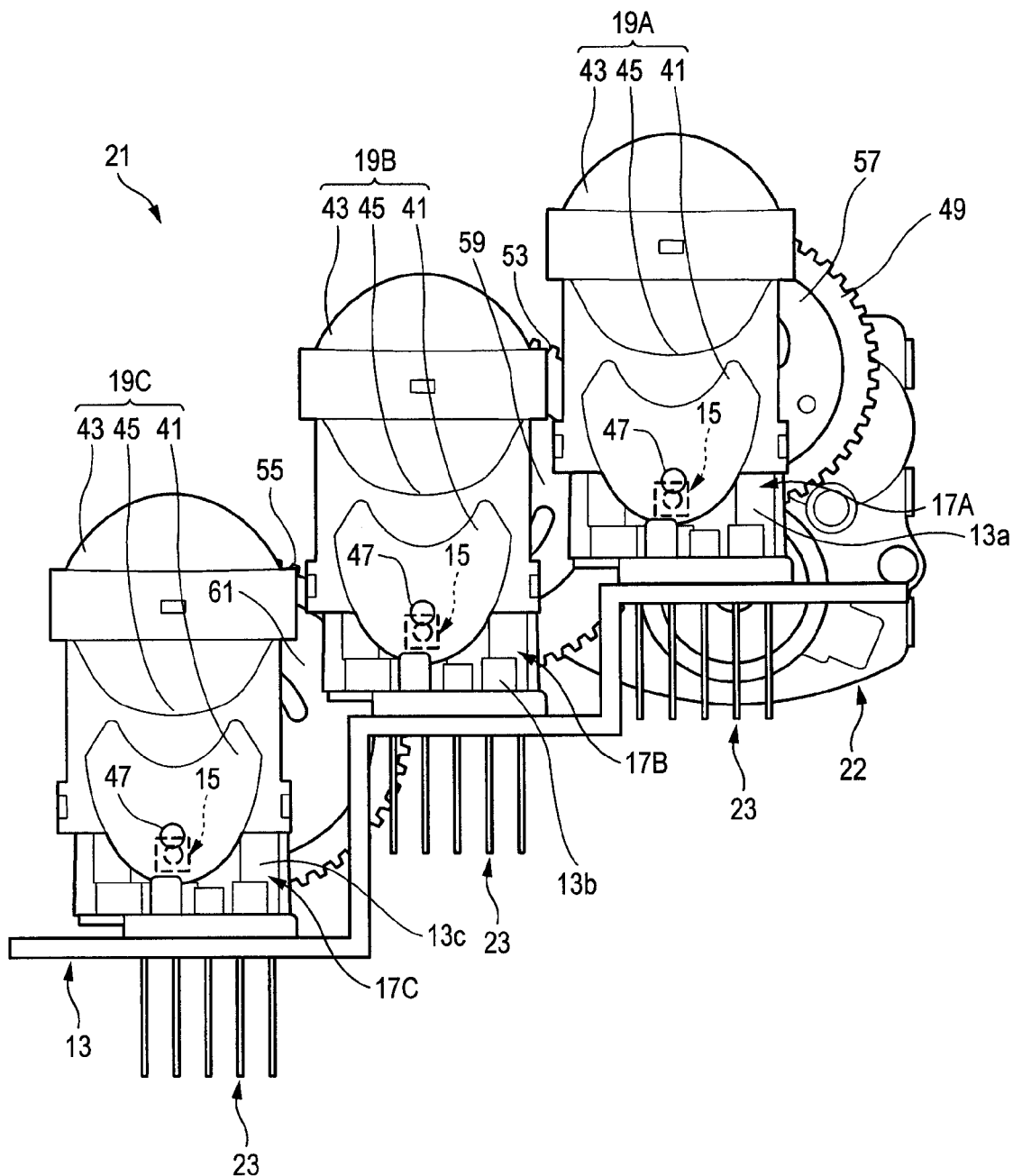
FIG. 5 is a plan view showing a state that an actuator of the swiveling mechanism is turned by 0 degree.
Figure 6:
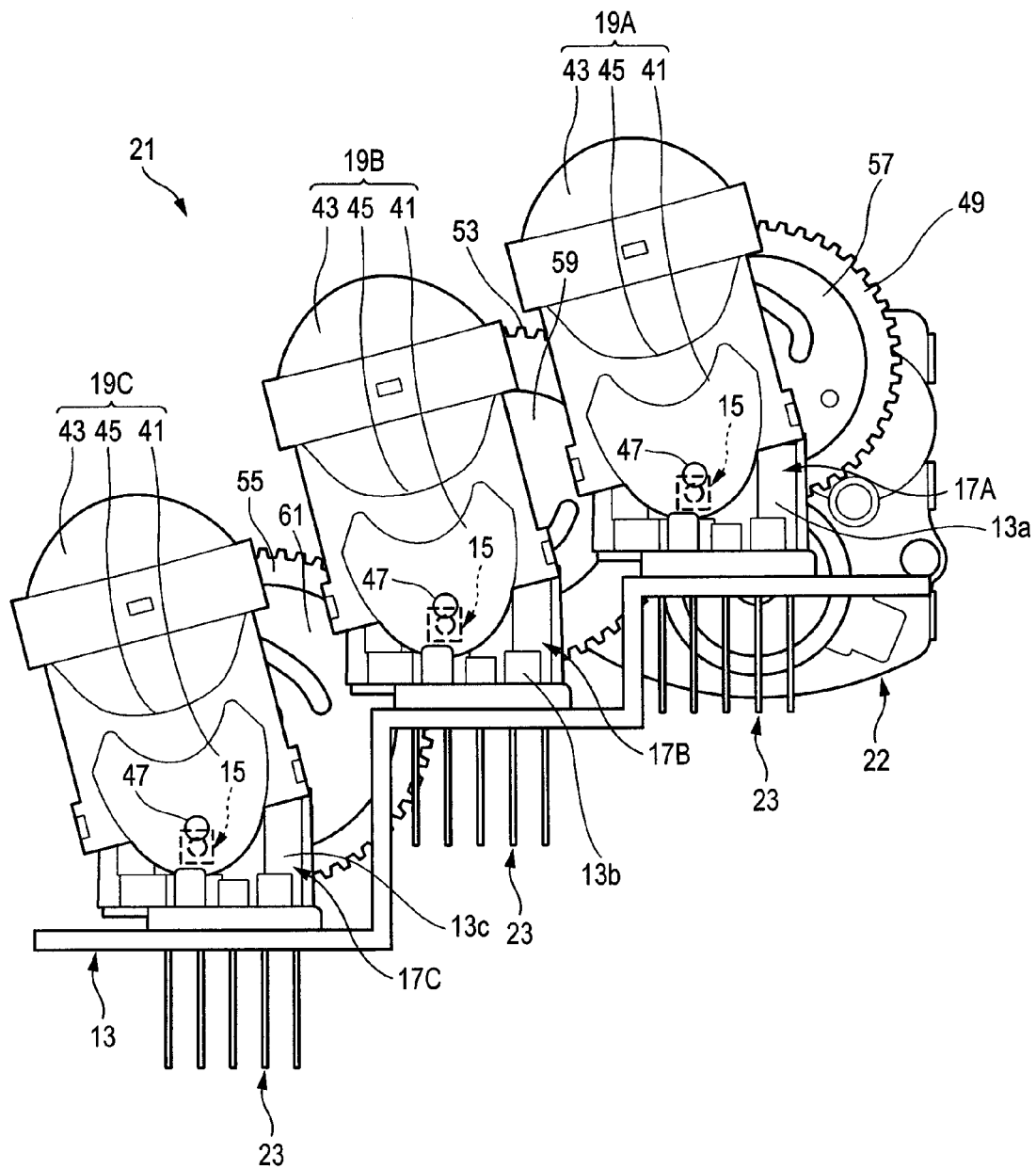
FIG. 6 is a plan view showing a state that an actuator of the swiveling mechanism is turned rightward by 90 degree.
Figure 7:
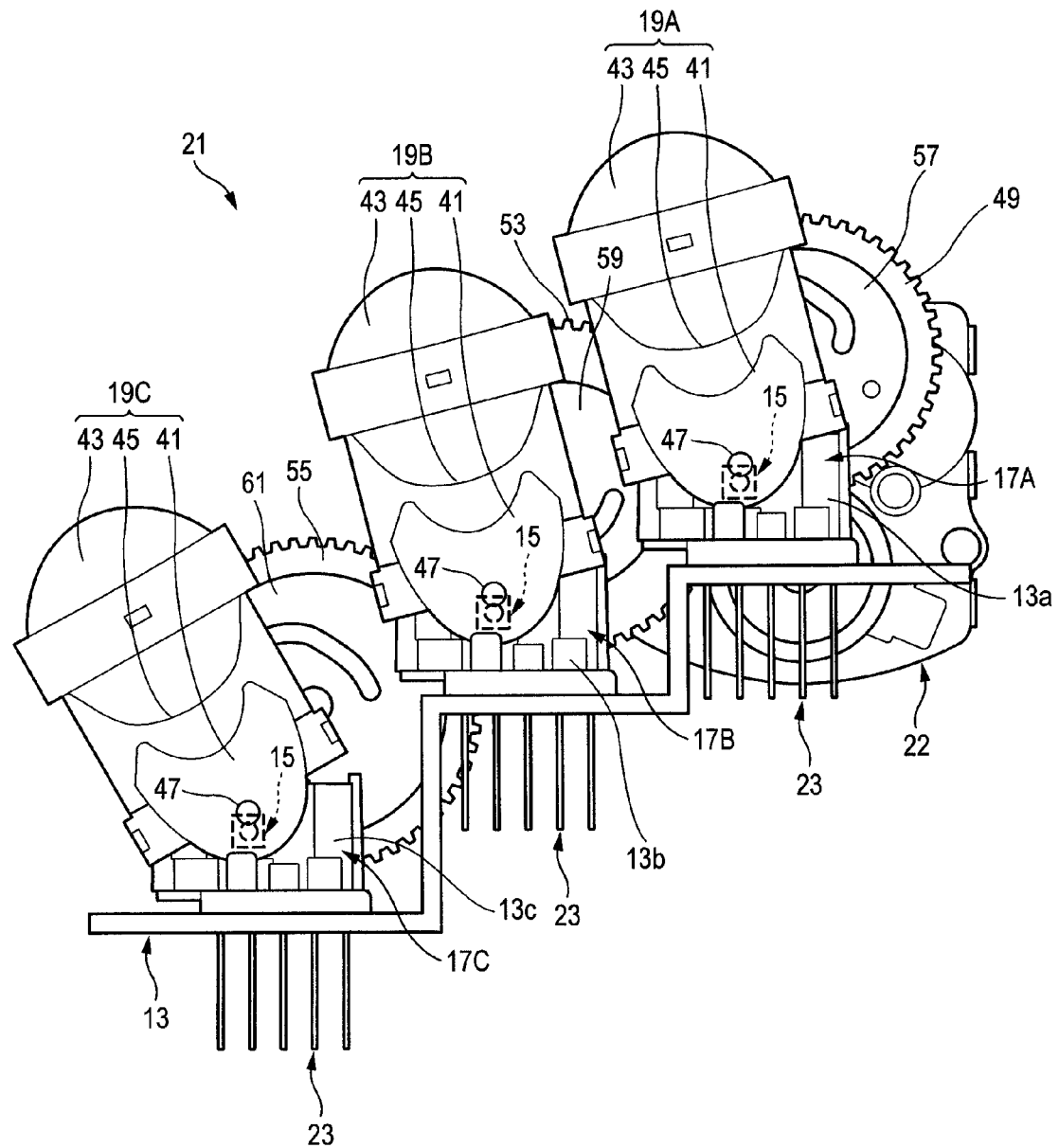
FIG. 7 is a plan view showing a state that an actuator of the swiveling mechanism is turned rightward by 125 degree.
Figure 8:
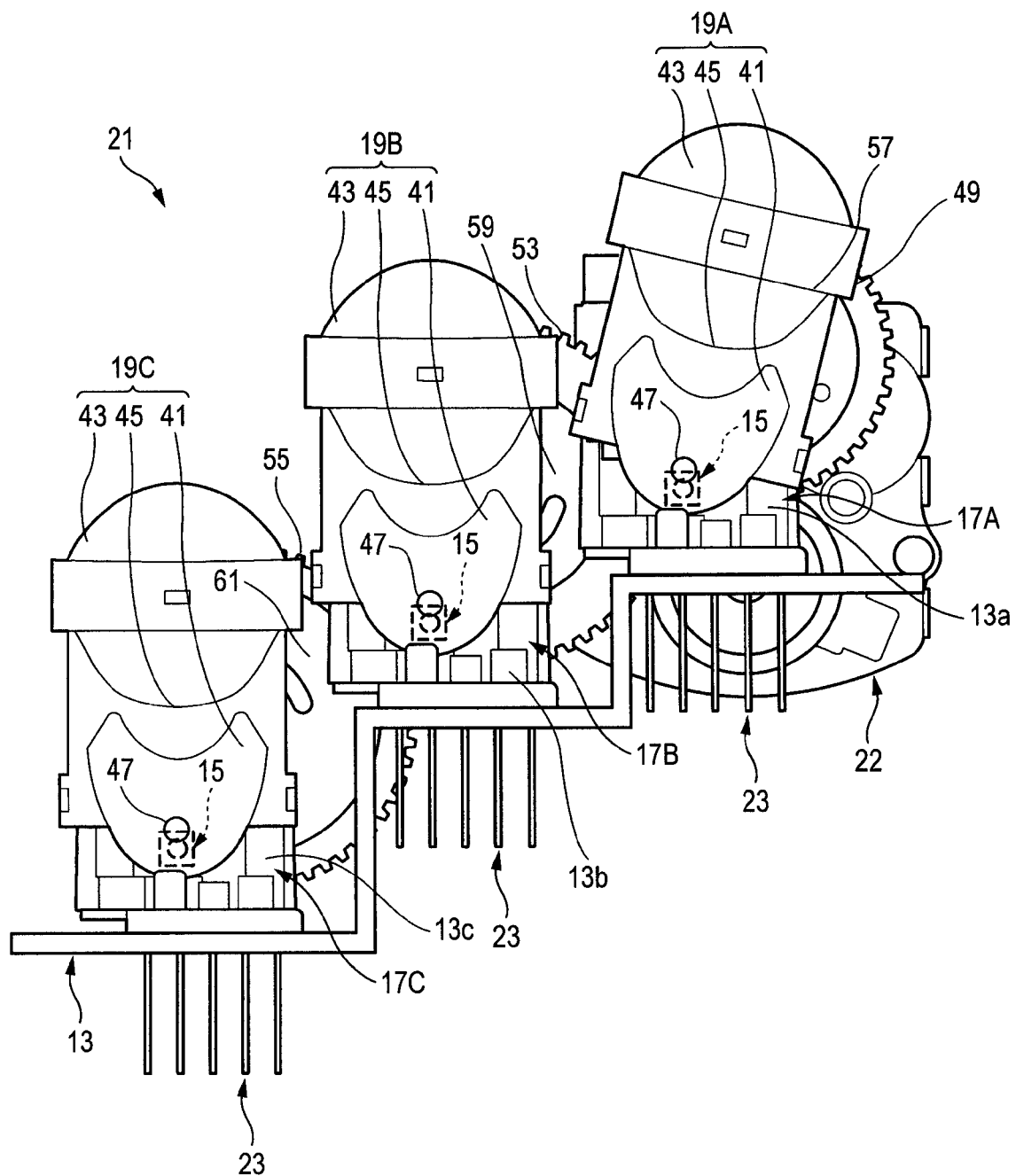
FIG. 8 is a plan view showing a state that an actuator of the swiveling mechanism is turned leftward by 35 degree.
Figure 9:
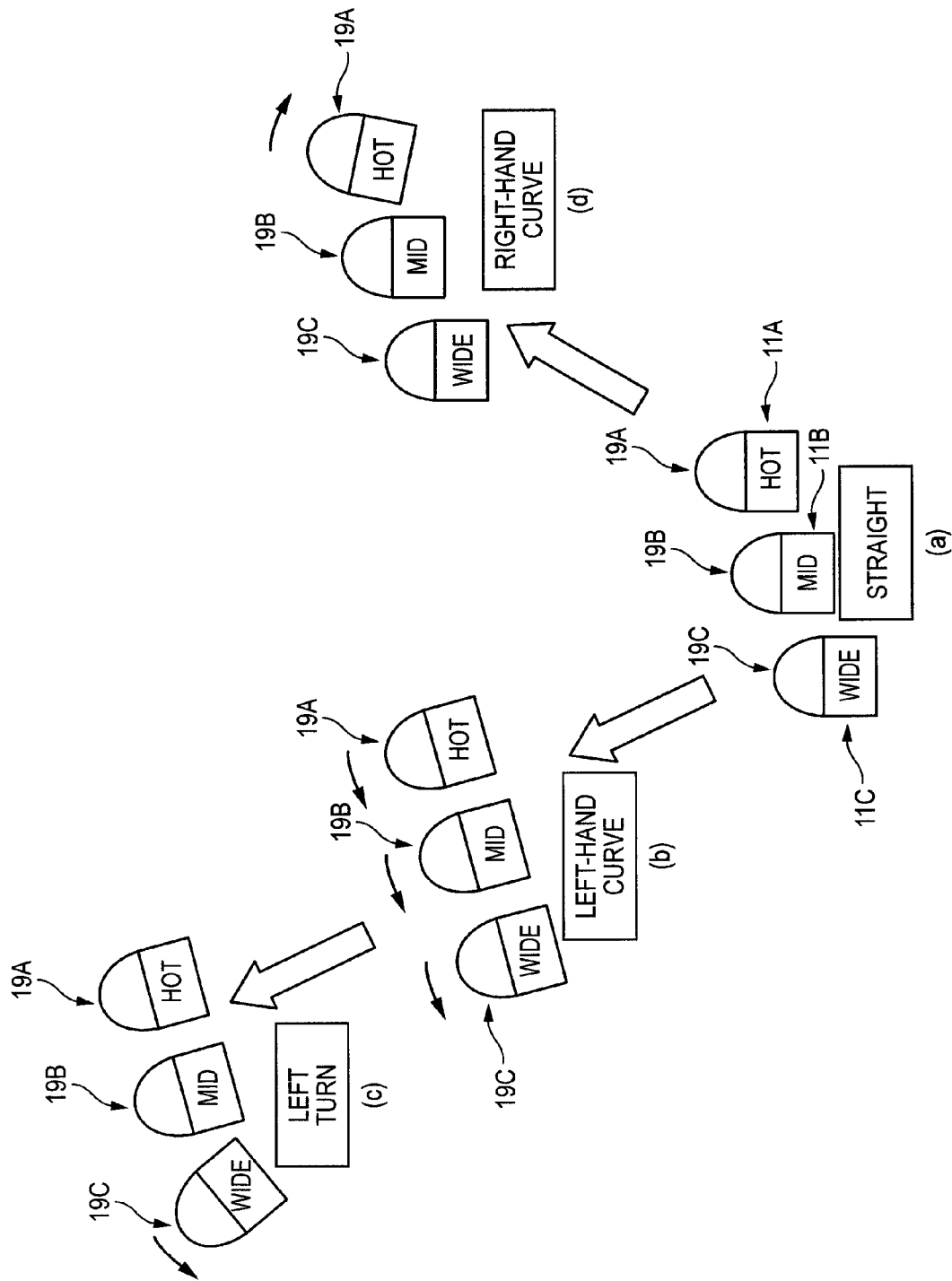
FIG. 9 is a schematic shift pattern diagram of the vehicle lamp respective optical units of which are turned in different directions in response to the steering operation.
Figure 10A:
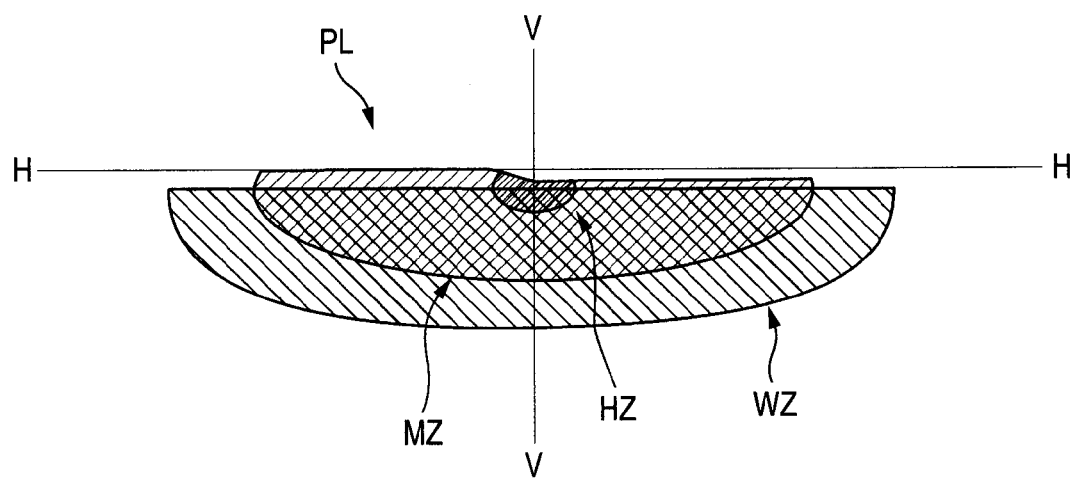
Figure 10B:
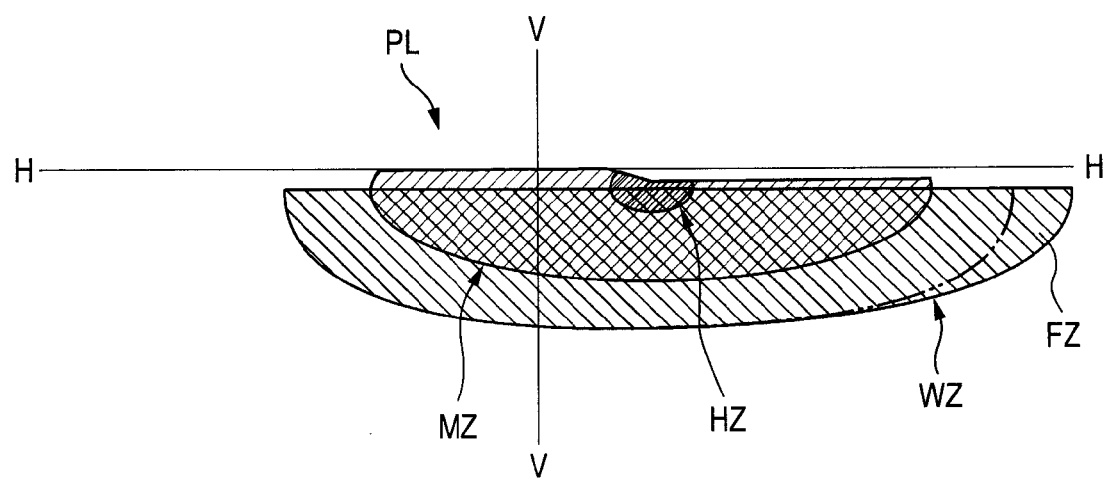

FIG. 5 is a plan view showing a state that an actuator of the swiveling mechanism is turned by 0 degree, FIG. 6 is a plan view showing a state that an actuator of the swiveling mechanism is turned rightward by 90 degree, FIG. 7 is a plan view showing a state that an actuator of the swiveling mechanism is turned rightward by 125 degree, FIG. 8 is a plan view showing a state that an actuator of the swiveling mechanism is turned leftward by 35 degree, FIG. 9 is a schematic shift pattern diagram of the vehicle lamp respective optical units of which are turned in different directions in response to the steering operation, and FIGS. 10A and 10B are views respectively showing a low-beam light distribution pattern that is formed on a virtual vertical screen, which is arranged in front of the lighting equipment by 25 m, by the light that is illuminated forward from the vehicle lamp, wherein FIG. 10A shows the light distribution pattern in a straight-ahead driving, and FIG. 10B shows the light distribution pattern in a right-hand curve.

As shown in FIG. 8 and (a) of FIG. 9, all the optical units 19A, 19B, 19C are directed forward in a state that the actuator 22 of the swivel driving mechanism 21 is at a rotation angle of 0 degree.

Then, when the output shaft of the actuator 22 is turned rightward by 90 degree in response to the left turn of the steering wheel, all the optical units 19A, 19B, 19C are turned outward by 15 degree, as shown in FIG. 6 and (b) of FIG. 9.

When the output shaft of the actuator 22 is turned rightward by 125 degree, the optical units 19A, 19B are maintained in a outward rotation state of 15 degree but the outermost optical unit 19C is are turned outward by 30 degree, as shown in FIG. 7 and (c) of FIG. 9.

In contrast, when the output shaft of the actuator 22 is turned leftward by 35 degree in response to the right turn of the steering wheel, the optical unit 19A is turned inward by about 7 degree but the optical units 19B, 19C are maintained in a forward rotation state, as shown in FIG. 8 and (d) of FIG. 9.

In this manner, the swivel driving mechanism 21 according to the vehicle lamp according to the first embodiment swivels plurality of optical units 19A, 19B, 19C together by one actuator in different strokes.

In other words, because one actuator 22 is driven, desired ones of a plurality of optical units 19A, 19B, 19C are operated together in different strokes, so that a desired light distribution can be formed. As a result, a flexible light distribution change can be realized by the small and inexpensive lighting equipment configuration.

Therefore, when a plurality of optical units 19A, 19B, 19C are arranged in the horizontal direction, respective optical units 19A, 19B, 19C are driven at different swiveling amounts (for example, a swiveling amount of the optical unit 19C on the outer side is larger than swiveling amounts of the optical units 19A, 19B on the inner side). As a result, an additional light distribution pattern can be moved in an angle range that is different in response to the steering angle, or the like of the vehicle.

Accordingly, as shown in FIG. 7, for example, when the vehicle turns to the left at an intersection, only the optical unit 19C is turned largely outward in the vehicle width direction by a predetermined angle (in the illustrated example, 15 degree). Therefore, an additional light distribution pattern FZ can be formed adjacent to the normal lo-beam light distribution pattern, and a visibility can be enhanced by sufficiently illuminating the forward road surface in the turning direction (see FIG. 10B).

In this manner, when the stroke of the dispersing optical unit 19C is increased larger than the strokes of the converging optical unit 19A and the intermediate optical unit 19B, for example, only a dispersing zone (middle luminous intensity area) WZ can be brought into the turning direction of the vehicle, while adequately holding the positions of the hot zone (high luminous intensity area) HZ and an middle zone (middle luminous intensity area) MZ, as shown in FIG. 10B, so that the overall light distribution is swiveled. As a result, fine formation of a light distribution pattern PL can be attained.

In the vehicle lamp 1 of the first embodiment, the driving systems of the optical units 19A, 19B, 19C are constructed by the first gear 49, the second input gear 51, the second output gear 53, and the third gear 55 for transmitting a rotating force of the actuator 22 of the swivel driving mechanism 21, and the first cam 57, the second cam 59, the third cam 61 respectively secured to the first gear 49, the second output gear 53, and the third gear 55.

Therefore, when the cam grooves 57a, 59a, 61a that are respectively engaged with the driven shafts 63 of the optical units 19A, 19B, 19C are formed to have desired offset profiles, it can be easy to individually set the optical units 19A, 19B, 19C to desired turning angles. Also, when plural sets of the first cam 57, the second cam 59, and the third cam 61 formed by different cam grooves 57a, 59a, 61a are previously prepared for the first gear 49, the second output gear 53, and the third gear 55, plural variations of the lighting equipment specifications applied to different angle controls can be selectively set easily.

In this case, when lengths of the rotating shaft 47 and the driven shaft 63 are respectively changed in the lamp units 11C, 11B, 11C, arrangements of these lamp units 11A, 11B, 11C in any vertical direction can be handled.

According to the vehicle lamp 1 of the present embodiment, the swivel driving mechanism 21 swivels a plurality of optical units 19A, 19B, 19C together indifferent strokes by one actuator 22. Therefore, desired ones of a plurality of optical units 19A, 19B, 19C are driven together in different strokes, and thus a desired light distribution can be formed. According to the vehicle lamp 1 of the present embodiment, a flexible light distribution change that can make sure of a good side visibility in the turning of the vehicle can be realized by a small inexpensive lighting equipment configuration.

Next, a vehicle lamp according to a second embodiment (second exemplary embodiment) of the present invention will be explained hereunder.

Figure 11:
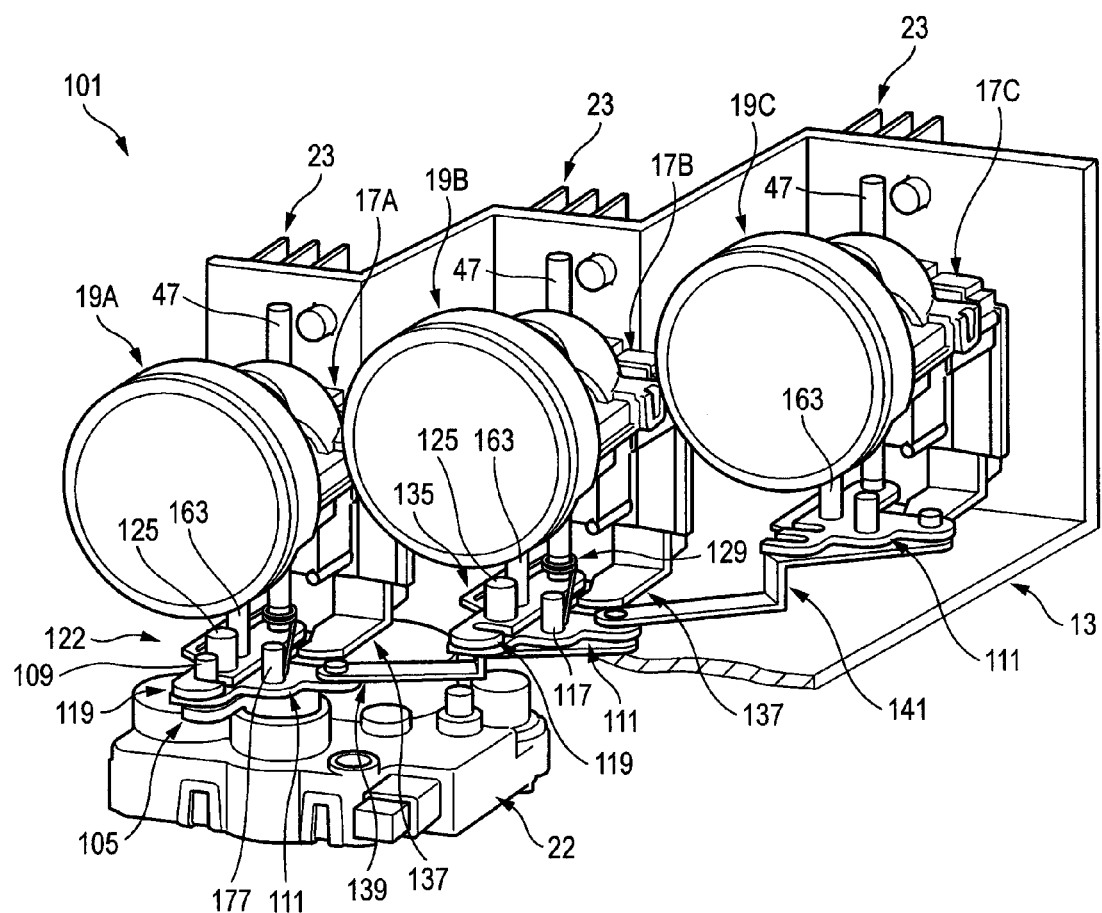
FIG. 11 is a pertinent perspective view of a vehicle lamp according to a second embodiment of the present invention.
Figure 12:
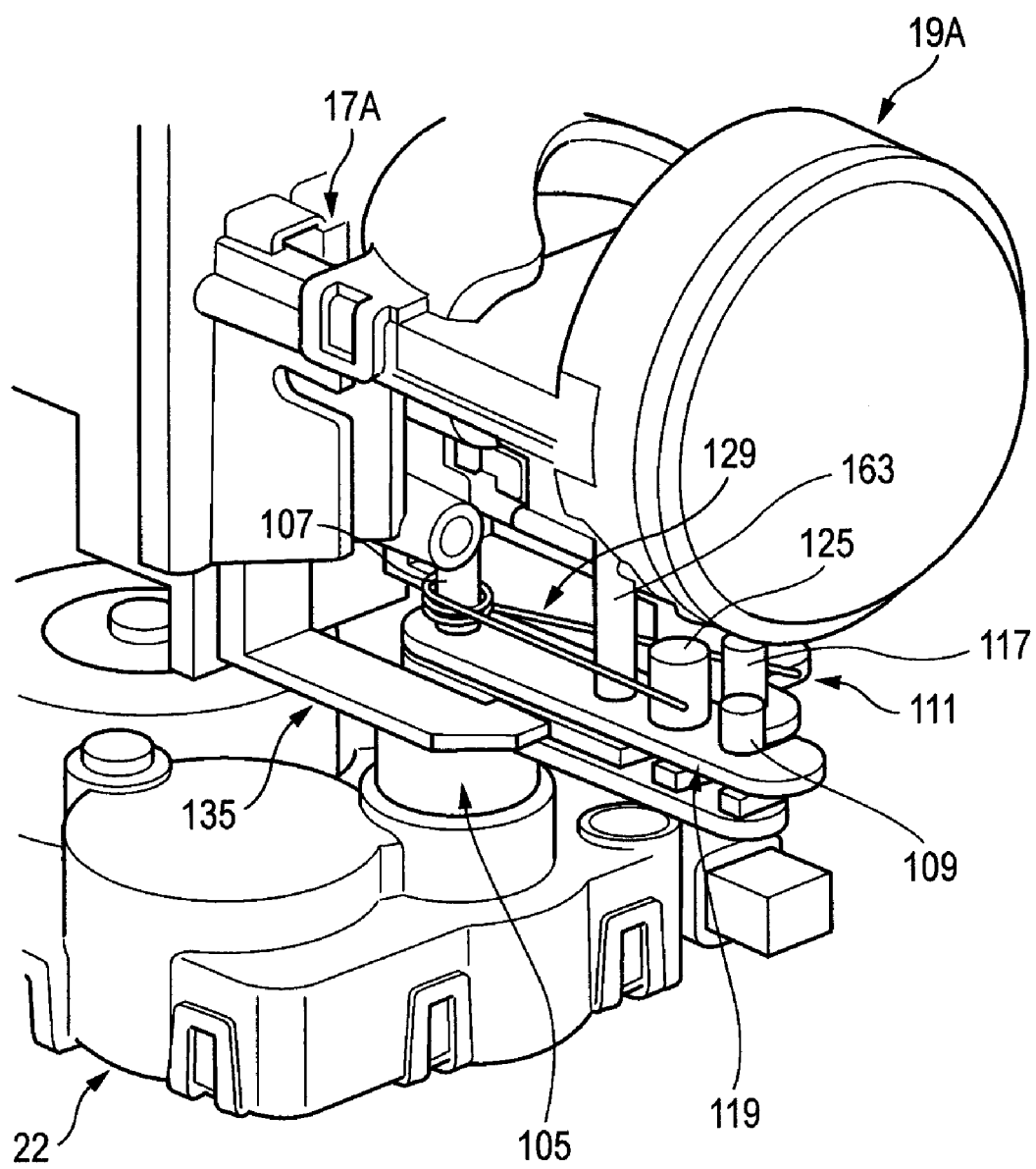
FIG. 12 is a pertinent enlarged perspective view of a link portion shown in FIG. 11.
Figure 13:
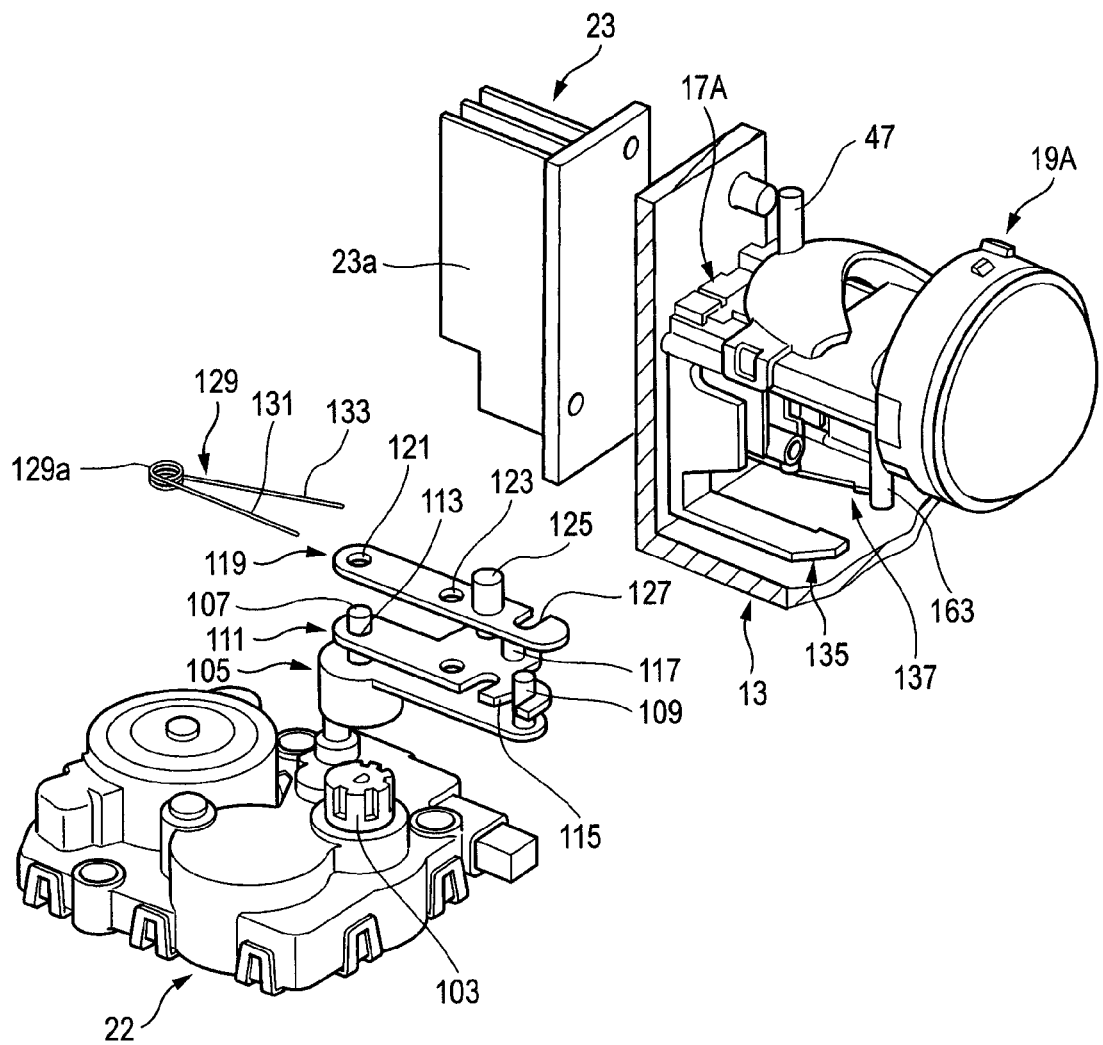
FIG. 13 is an exploded perspective view of a link portion shown in FIG. 12.

FIG. 11 is a pertinent perspective view of a vehicle lamp according to a second embodiment of the present invention, FIG. 12 is a pertinent enlarged perspective view of the link portion shown in FIG. 11, and FIG. 13 is an exploded perspective view of the link portion shown in FIG. 12. Here, the same reference symbols are affixed to the same constituent members as those in the vehicle lamp of the first embodiment, and their detailed explanation will be omitted herein.

A vehicle lamp 101 according to the second embodiment is similar to the vehicle lamp 1 except that the driving systems of the optical units 19A, 19B, 19C are different from those in the first embodiment.

A swivel driving mechanism 122 of the vehicle lamp 101 swivels the optical units 19A, 19B, 19C at desired turn angles by employing a linking mechanism.

As shown in FIG. 11 to FIG. 13, a base end of an actuator link 105 is fixed to an output shaft 103 of the actuator 22 provided to the horizontal portion 13d of the unit mounting portion 13.

A supporting shaft 107 coaxially provided with the output shaft 103 and a pressing shaft 109 positioned on the outside of the turning radius by the supporting shaft 107 are provided upright to the actuator link 105.

An intermediate link 111 is provided just over the actuator link 105, and a supporting hole 113 in the base end of the intermediate link 111 is fitted on the supporting shaft 107. An intermediate link C-shaped notched portion 115 that is opened in the clockwise turning direction of the pressing shaft 109 in FIG. 13 is formed at the top end of the intermediate link 111, and the intermediate link C-shaped notched portion 115 is engaged with the pressing shaft 109 of the actuator link 105. That is, the intermediate link 111 follows up the anticlockwise turning of the actuator link 105. Also, a spring seat projection 117 is provided upright to the top end of the intermediate link 111, and a holding spring 133 of a torsion coil spring 129 described later is engaged with the spring seat projection 117.

An optical unit side link 119 is provided just over the intermediate link 111, and a supporting hole 121 in the base end of the optical unit side link 119 is fitted on the supporting shaft 107 of the actuator link 105. A force application axis engaging hole 123 is formed on the outside of the turning radius by the supporting hole 121 of the optical unit side link 119, and a force application axis 163 of the optical unit 19A is fitted into the force application axis engaging hole 123.

A spring seat projection 125 is provided upright on the outside of the turning radius of the force application axis engaging hole 123. A holding spring 131 of the torsion coil spring 129 descried later is engaged with the spring seat projection 125. An optical unit side link C-shaped notched portion 127 opened in the anticlockwise turning direction of the pressing shaft 109 in FIG. 13 is formed on the outside of the turning radius of the spring seat projection 125. The optical unit side link C-shaped notched portion 127 engages with the pressing shaft 109 of the actuator link 105. That is, the optical unit side link 119 follows the clockwise turning of the actuator link 105.

The rotating shaft 47 of the optical unit 19A is coaxially arranged with the output shaft 103 of the actuator 22 and the supporting shaft 107 of the actuator link 105. Then, the actuator link 105, the intermediate link 111, and the optical unit side link 119 are turned on the base end that is coaxially supported with the output shaft 103 of the actuator 22.

Therefore, the actuator link 105 acts as the driving output side. The intermediate link 111 engages with the actuator link 105 only when this link 105 is turned in the anticlockwise direction, and the optical unit side link 119 engages with the actuator link 105 only when this link 105 is turned in the clockwise direction.

As shown in FIG. 12, a torsion portion 129a of the torsion coil spring 129 is fitted on the supporting shaft 107 of the actuator link 105, and a pair of holding springs 131, 133 are extended from the torsion portion 129a. The torsion coil spring 129 the torsion portion 129a of which is fitted on the supporting shaft 107 energizes to hold the spring seat projection 125 and the spring seat projection 117 in the condition that one holding spring 131 is hooked on the spring seat projection 125 of the optical unit side link 119 and the other holding spring 133 is hooked on the spring seat projection 117 of the intermediate link 111.

Also, an intermediate link stopper 135 and an optical unit side link stopper 137 are provided upright on the bottom of the light source unit 17A that is paired with the optical unit 19A. The intermediate link stopper 135 restricts the turn of the intermediate link 111 in the anticlockwise direction, and the optical unit side link stopper 137 restricts the turn of the optical unit side link 119 in excess of 15 degree in the anticlockwise direction.

As shown in FIG. 11, the intermediate link 111, the optical unit side link 119, the torsion coil spring 129, the intermediate link stopper 135, and the optical unit side link stopper 137 are provided to the optical unit 19B. Also, only the intermediate link 111 is provided to the optical unit 19C. Also, the intermediate links 111 of the optical unit 19A and the optical unit 19B are coupled by a coupling link 139. The intermediate links 111 of the optical unit 19B and the optical unit 19C are coupled by a coupling link 141.

Therefore, a plurality of intermediate links 111 are respectively provided to correspond to the optical units 19A, 19B, 19C, and their base ends are turnably supported to the supporting shaft 107. Also, the intermediate links 111 are coupled to be mutually turnable by the coupling links 139, 141, and the force application axis 163 of the corresponding optical unit 19C is engaged with only the downstream side in the coupling force transmitting direction.

Also, the optical unit side links 119 are provided to correspond to the intermediate links 111 except the downstream side in the coupling force transmitting direction (i.e., the intermediate links 111 corresponding to the optical units 19A, 19B). The optical unit side links 119 are turnably supported to be coaxially with the supporting shaft 107, and the force application axes 163 of the optical units 19A, 19B are engaged with the optical unit side links 119.

Also, the torsion coil spring 129, the spring seat projection 117, the spring seat projection 125, the optical unit side link stopper 137, and the intermediate link stopper 135 constitute an interlock separating mechanism.

The interlock separating mechanism turns relatively the optical unit side links 119 and the intermediate link 111 in predetermined rotation positions. Here, in the present embodiment, the "relative turn" means that the intermediate link 111 is turned on the supporting shaft 107 with respect to the optical unit side link 119 that is stopped by the optical unit side link stopper 137 or the optical unit side link 119 is turned on the supporting shaft 107 with respect to the intermediate link 111 that is stopped by the intermediate link stopper 135.

Next, a link-type driving system of the optical units 19A, 19B, 19C according to the second embodiment will be explained hereunder.

Figure 14:
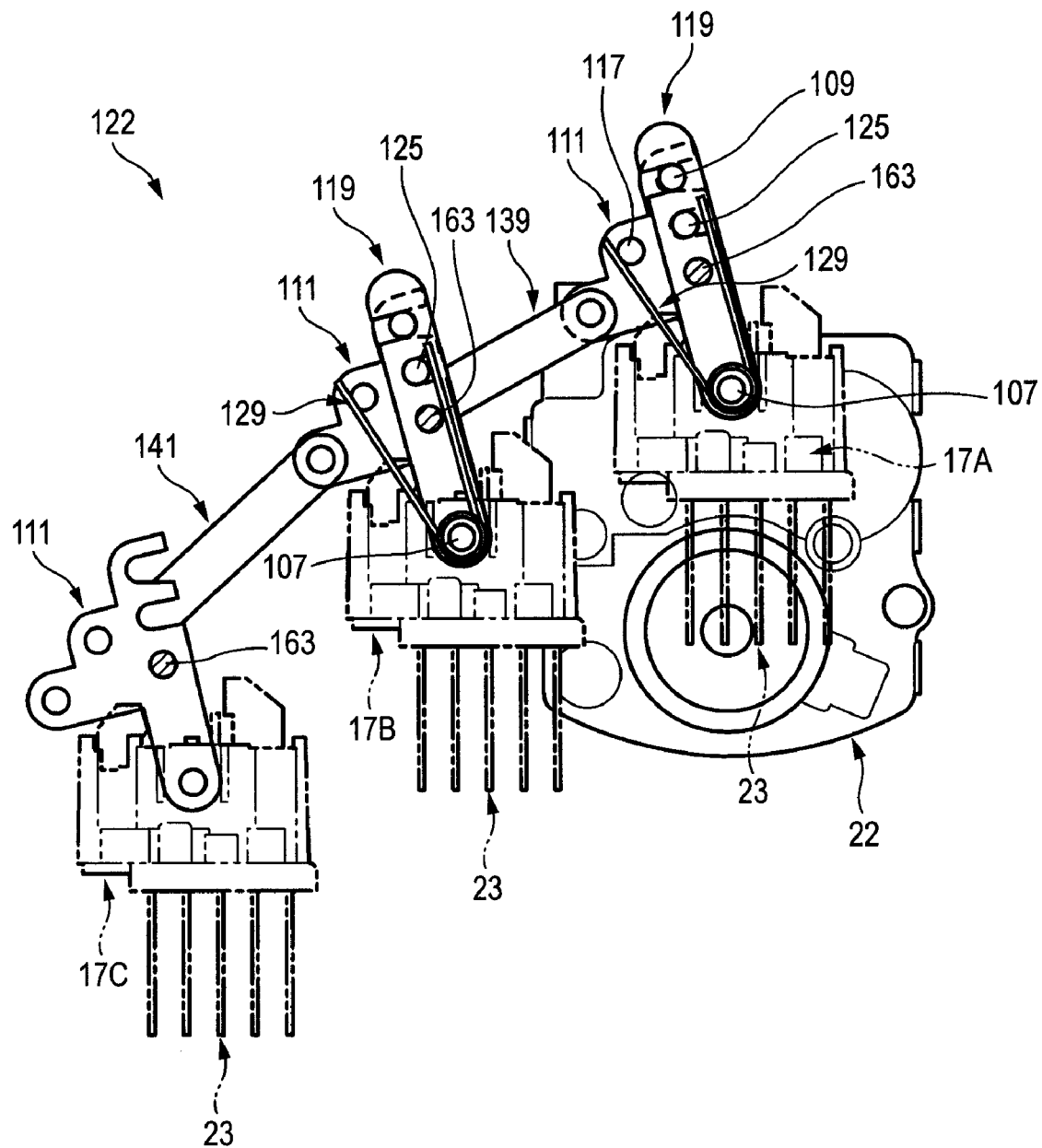
FIG. 14 is a plan view of a link portion all optical units of which are directed outward by 15 degree.
Figure 15:
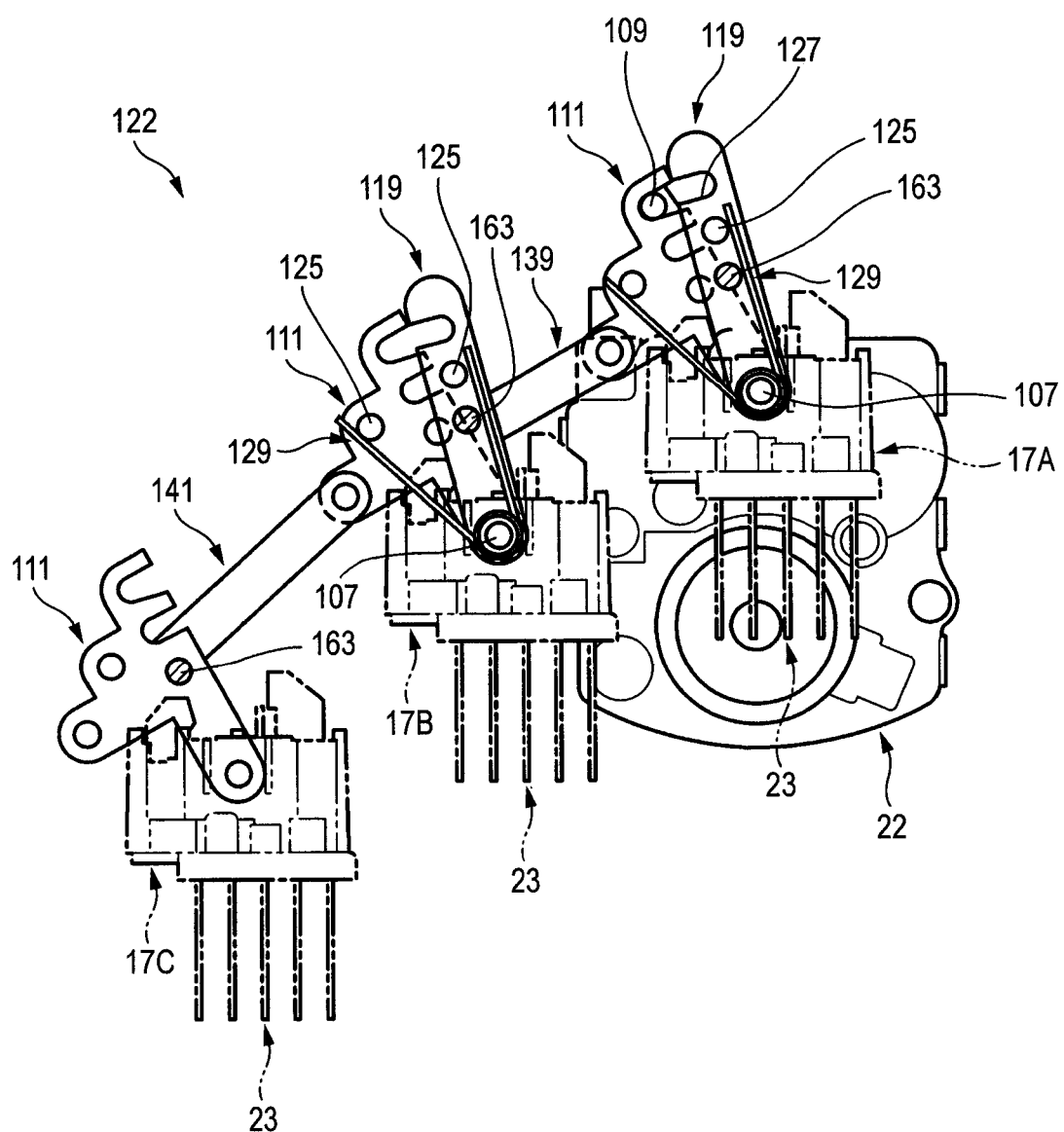
FIG. 15 is a plan view of a link portion two inner optical units of which are directed outward by 15 degree and two outer optical units of which are directed outward by 30 degree.
Figure 16:
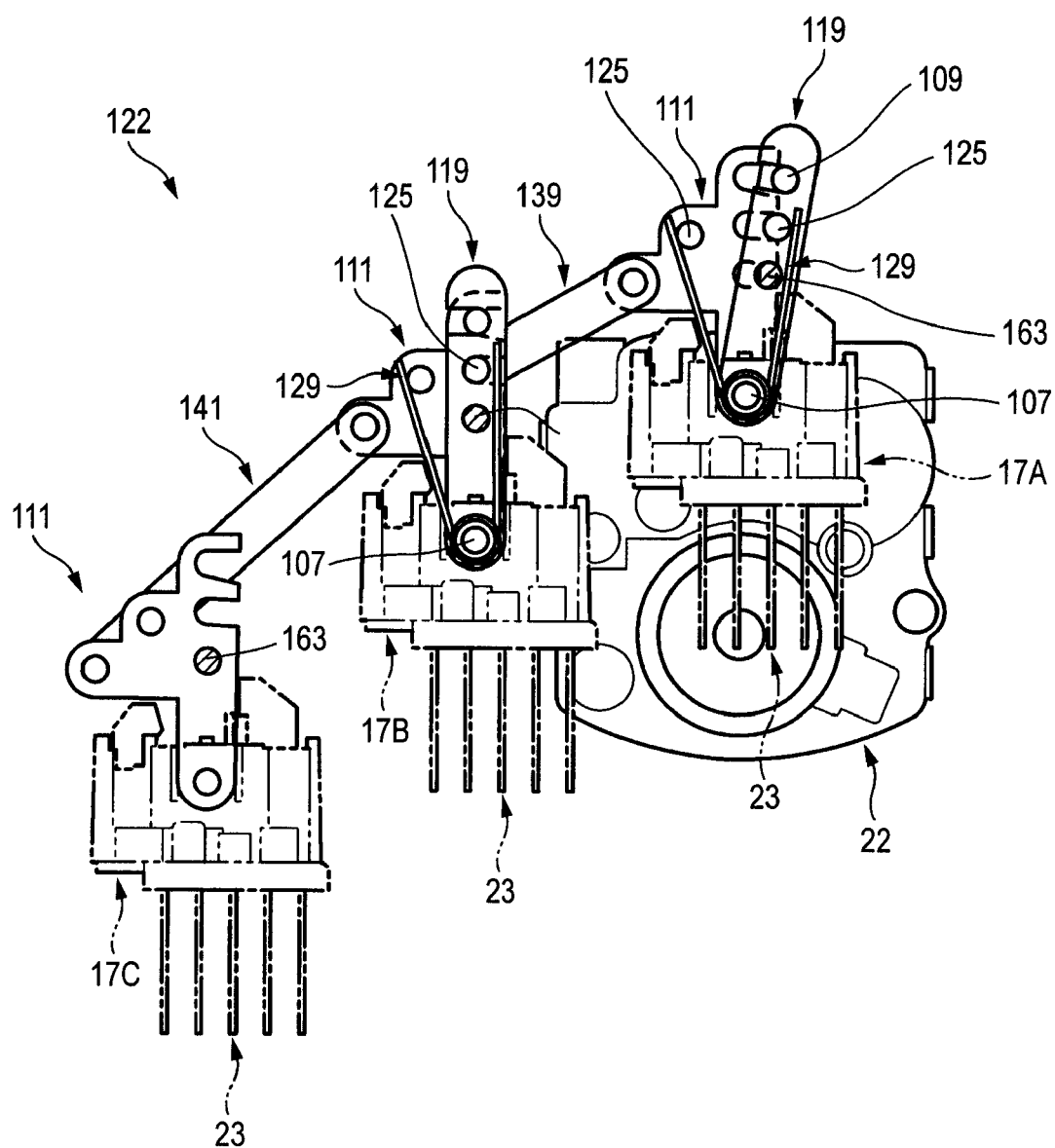
FIG. 16 is a plan view of a link portion one inner optical unit of which is directed inward by 10 degree and two outer optical units of which are directed in a straight-ahead direction.

FIG. 14 is a plan view of the link portion all optical units of which are directed outward by 15 degree, FIG. 15 is a plan view of the link portion two inner optical units of which are directed outward by 15 degree and two outer optical units of which are directed outward by 30 degree, and FIG. 16 is a plan view of a link portion one inner optical unit of which is directed inward by 10 degree and two outer optical units of which are directed in a straight-ahead direction.

All the optical units 19A, 19B, 19C are normally directed in the straight ahead direction, as shown in FIG. 11. Here, for example, when the output shaft 103 of the actuator 22 is turned leftward by 15 degree in response to the left turn of the steering wheel, the actuator link 105 is turned leftward by 15 degree and also the intermediate link 111 engaged with the pressing shaft 109 is turned leftward by 15 degree.

When the intermediate link 111 is turned leftward by 15 degree, the optical unit side link 119 is turned leftward by 15 degree via the torsion coil spring 129 that holds the spring seat projection 117 of the intermediate link 111 and the spring seat projection 125 of the optical unit side link 119. As a result, as shown in FIG. 14, the optical unit 19A whose force application axis 163 is fitted into the force application axis engaging hole 123 of the optical unit side link 119 is turned leftward by 15 degree.

Also, the optical units 19B, 19C are turned leftward by 15 degree via the intermediate link 111 of the optical unit 19B, which is coupled to the intermediate link 111 of the optical unit 19A via the coupling link 139, and the intermediate link 111 of the optical unit 19C coupled via the coupling link 141. At that time, the optical unit side links 119, 119 of the optical units 19A, 19B respectively come into contact with the optical unit side link stoppers 137, 137, and thus the left turn of these links of 15 degree or more is restricted.

When the output shaft 103 of the actuator 22 is turned further leftward by 15 degree from the state in FIG. 14 (turned leftward by 30 degree in total from the initial state), the optical unit side links 119, 119 of the optical units 19A, 19B are held at that rotation angle as they are because the turn of these links are restricted by the optical unit side link stoppers 137, 137, as shown in FIG. 15, whereas the pressing shaft 109 of the actuator link 105 is released from the optical unit side link C-shaped notched portion 127 of the optical unit side link 119 and presses the intermediate link C-shaped notched portion 115. Therefore, the intermediate link 111 is turned further leftward by 15 degree against an energizing force of the torsion coil spring 129. That is, the intermediate link 111 of the optical unit 19A and the optical unit 19B expand the torsion coil springs 129, 129 and turn leftward by 30 degree. As a result, two inner optical units 19A, 19B are turned outward by 15 degree, and only one outer optical unit 19C is turned outward by 30 degree.

On the contrary, for example, when the output shaft 103 of the actuator 22 is conversely turned rightward by 10 degree from the initial state indicating the straight ahead direction shown in FIG. 11 in response to the right turn of the steering wheel, the intermediate link 111 of the optical unit 19A comes into contact with the intermediate link stopper 135 and its turn is restricted. In contrast, the pressing shaft 109 is released from the intermediate link C-shaped notched portion 115, and the actuator link 105 of the optical unit 19A is turned rightward by 10 degree against an energizing force of the torsion coil spring 129.

Accordingly, the optical unit side link 119 that causes the pressing shaft 109 to engage with the optical unit side link C-shaped notched portion 127 is also turned rightward by 10 degree. That is, as shown in FIG. 16, two outer optical units 19B, 19C are maintained to be directed in the straight ahead direction because the intermediate link 111 is not turned, while one inner optical unit 19A is turned rightward by the optical unit side link 119 by 10 degree.

According to the vehicle lamp 101 equipped with this link-type driving system, the intermediate link 111 and the optical unit side link 119 with which the force application axes 163 of the optical units 19A, 19B, 19C are respectively engaged are relatively turned in predetermined turning positions by the interlock separating mechanism. Therefore, it can be easy to independently set the individual optical units 19A, 19B, 19C to the desired turning angles. Also, since the intermediate link 111 and the optical unit side link 119 can be constructed by a thin link plate, a swiveling mechanism that is lighter in weight than the configuration using a large number of gears can be realized.

In this case, the configurations of the lamp unit, the light source, the optical unit, the swiveling mechanism, the driving unit, and the like in the vehicle lamp of the present invention are not restricted to those in the above embodiments. It is of course that various modes can be employed based on a gist of the present invention.

While description has been made in connection with specific exemplary embodiments and modified examples of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF REFERENCE NUMERALS AND SIGNS 1 vehicle lamp
13 unit mounting portion
15 light emitting element (light source)
17A, 17B, 17C light source unit
19A, 19B, 19C optical unit
21 swivel driving mechanism (swiveling mechanism)
22 actuator (driving unit)
57 first cam
57a, 59a, 61a cam groove
59 second cam
61 third cam
63 driven shaft
107 supporting shaft
111 intermediate link
117 spring seat projection (interlock separating mechanism)
119 optical unit side link
125 spring seat projection (interlock separating mechanism)
129 torsion coil spring (interlock separating mechanism)
135 intermediate link stopper (interlock separating mechanism)
137 optical unit side link stopper (interlock separating mechanism)
139, 141 coupling link
163 force application axis

What is claimed is:

1. A vehicle lamp comprising:
   a plurality of lamp units respectively including light sources, and optical units for emitting light from the light sources ahead of the lamp unit; and
   a driving unit configured to swivel the plurality of optical units in different strokes, wherein the driving unit comprises a plurality of driven shafts respectively provided for the optical units; plurality of cams respectively provided for the optical units, wherein the plurality of cams are mutually operable together.

2. The vehicle lamp according to claim 1, wherein the plurality of optical units comprise a converging optical unit, an intermediate optical unit, and a dispersing optical unit sequentially arranged from an inner side to an outer side in a vehicle width direction, and
   a stroke of the dispersing optical unit is larger than strokes of the converging optical unit and the intermediate optical unit.

3. The vehicle lamp according to claim 1, wherein the driving unit further comprises:
   a plurality of cam grooves respectively provided for the cams and engaged with the respective driven shafts to swivel the optical units in the different strokes.

4. A vehicle lamp comprising:
   a plurality of lamp units respectively including light sources, and optical units for emitting light from the light sources ahead of a driving unit; and a driving unit configured to swivel the plurality of optical units in different strokes;wherein the driving unit comprises:
   a plurality of force application axes respectively provided for the optical units;
   a plurality of intermediate links respectively provided for the optical units, wherein base ends of the intermediate links are turnably supported by respective supporting shafts, the intermediate links are coupled via coupling links to be mutually operable, and the intermediate links are engaged with only one of the force application axes corresponding to a downstream side in an interlocking force transmitting direction;
   a plurality of optical unit side links provided to correspond to the intermediate links except the downstream side in the interlocking force transmitting direction, turnably supported and coaxially disposed with the supporting shafts, and engaged with the force application axes of the corresponding optical units; and
   an interlock separating mechanism for relatively turning the optical unit side links and the intermediate links in predetermined turning positions.

* * * * *